United States Patent
Yamanaka

(10) Patent No.: US 7,484,432 B2
(45) Date of Patent: Feb. 3, 2009

(54) PARKING BRAKE DEVICE

(75) Inventor: Fumikage Yamanaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 209 days.

(21) Appl. No.: 11/143,098

(22) Filed: Jun. 2, 2005

(65) Prior Publication Data
US 2006/0053946 A1    Mar. 16, 2006

(30) Foreign Application Priority Data
Jun. 24, 2004    (JP)    ............... 2004-186679

(51) Int. Cl.
*F16C 1/22*    (2006.01)
*F16D 65/14*    (2006.01)
(52) U.S. Cl. .................. 74/502.6; 188/2 D; 188/204 R
(58) Field of Classification Search ............... 74/502.4, 74/502.6; 188/2 D, 16, 204 R, 10; 303/6.1; B60T 11/08, B60T 11/06
See application file for complete search history.

(56) References Cited
U.S. PATENT DOCUMENTS

| 1,524,342 | A | * | 1/1925 | De Ruyter | .................. | 188/10 |
| 1,996,332 | A | * | 4/1935 | Grinslade | ............... | 188/204 R |
| 4,205,735 | A | * | 6/1980 | Murray | ........................ | 188/16 |
| 6,186,282 | B1 | * | 2/2001 | Juan | ........................ | 188/24.16 |
| 6,305,238 | B1 | * | 10/2001 | Gabas | ........................ | 74/502.6 |
| 6,419,328 | B1 | * | 7/2002 | Kinoshita | ................... | 303/6.1 |
| 6,997,289 | B2 | * | 2/2006 | Iwagawa et al. | ........... | 188/2 D |
| 2003/0070884 | A1 | | 4/2003 | Wang | | |
| 2004/0163896 | A1 | * | 8/2004 | Wang | ......................... | 188/2 D |

FOREIGN PATENT DOCUMENTS
DE    2 325 539    * 11/1974
DE    199 53 947 A1    * 5/2000

(Continued)

OTHER PUBLICATIONS
Translation of DE 199 53 947 A1, Thomas Schmidt, May 2000, PTO Aug. 1972.*

*Primary Examiner*—Vinh T Luong
(74) *Attorney, Agent, or Firm*—Carrier, Blackman & Associates, P.C.; William D. Blackman; Joseph P. Carrier

(57) ABSTRACT

A parking brake device includes a booster mechanism having an intermediate lever pivotally supported at a bracket, and a movable pulley supported at a tip end of the intermediate lever. When a first operation cable is pulled by operating a parking brake pedal, the movable pulley around which an intermediate portion of the inner cable is wound is pulled with doubled force, and the doubled pulling force is further boosted due to the lever ratio of the intermediate lever which supports the movable pulley, and is transmitted via an equalizer and a second operation cable to a brake device provided at a wheel with the pulling force boosted to a boost ratio twice as much as the lever ratio. By combining the movable pulley and the intermediate lever, the length of the intermediate lever to obtain the same boost ratio can be made half as compared with the case where only the intermediate lever is used, thereby making the booster mechanism compact. Thus, a parking brake device is made compact while a boost ratio of a booster mechanism of the parking brake device is secured.

16 Claims, 3 Drawing Sheets

FOREIGN PATENT DOCUMENTS

| | | | |
|---|---|---|---|
| EP | 0 894 686 A2 | * | 7/1998 |
| FR | 2 525 167 A | | 10/1983 |
| GB | 1 467 679 A | | 3/1977 |
| JP | 60-92948 | * | 5/1985 |
| JP | 01-289750 | | 11/1989 |
| JP | 2003-335235 | * | 11/2003 |

* cited by examiner

PARKING BRAKE DEVICE

RELATED APPLICATION DATA

Japanese priority application No. 2004-186679, upon which the present application is based, is hereby incorporated in its entirety herein by reference.

BACKGROUND OF THE INVENTION

1. Field of the Invention

The present invention relates to a parking brake device in which operation of a brake operation element is transmitted to a brake device via an operation cable and a booster mechanism.

2. Description of the Related Art

In a parking brake device of an automobile, operation of a brake operation element such as a parking brake pedal is transmitted to a brake device provided at a vehicle's wheels via an operation cable, and in this process, the operating force of the brake operation element is boosted by a booster mechanism before being transmitted to the brake device. The booster mechanism disclosed in Japanese Patent Application Laid-open No. 1-289750 comprises an intermediate lever with one end pivotally supported at a vehicle body, the other end thereof connected to the brake operation element via a front cable, and an intermediate portion thereof connected to the brake device via a connection cable, an equalizer and a rear cable. Accordingly, when the front cable is pulled by operating the brake operation element, the intermediate lever swings, and the movement of the intermediate lever actuates the brake device via the connection cable, the equalizer and the rear cable. At this time, the ratio of the distance from the fulcrum of the intermediate lever to the connection point of the front cable to the distance from the fulcrum of the intermediate lever to the connection point of the connection cable, namely, the lever ratio of the intermediate lever, becomes the boost ratio of the booster mechanism.

The above-described conventional brake device has the problem that when a large boost ratio of the booster mechanism is to be secured, it is necessary to set the lever ratio of the intermediate lever to be large, and therefore, the intermediate lever increases in size which increases the space required for layout.

SUMMARY OF THE INVENTION

The present invention has been achieved in view of the above circumstances, and has an object to make a parking brake device compact while securing a sufficiently large boost ratio of a booster mechanism of the parking brake device.

In order to achieve the above-mentioned object, according to the present invention, there is provided a parking brake device in which an operation of a brake operation element is transmitted to a brake device via operation cables and a booster mechanism, wherein the booster mechanism comprises: an intermediate lever having two opposing ends, with one end pivotally supported at a vehicle body; a movable pulley rotatably supported at the other end of the intermediate lever; a first operation cable with an intermediate portion wound around the movable pulley and opposite ends respectively connected to the brake operation element and the vehicle body; and a second operation cable with opposite ends respectively connected to an intermediate portion of the intermediate lever and the brake device.

A parking brake pedal 12 of the embodiment corresponds to a brake operation element of the present invention, first and second operation cables 13 and 16 correspond to operation cables of the present invention, and a bracket 22 of the embodiment corresponds to a vehicle body of the present invention.

According to the present invention, when a first operation cable is pulled by operating a brake operation element, a movable pulley around which an intermediate portion of the first operation cable is wound is pulled with doubled force, and the doubled pulling force is further boosted due to the lever ratio of the intermediate lever which supports the movable pulley, and is transmitted to a brake device via a second operation cable with the pulling force finally boosted to twice as much as the lever ratio. By combining the movable pulley and the intermediate lever, the length of the intermediate lever to obtain a given boost ratio can be reduced by half as compared with the case where only the intermediate lever is used, thereby making the booster mechanism compact.

The above-mentioned object, other objects, characteristics, and advantages of the present invention will become apparent from an explanation of a present embodiment, which will be described in detail below by reference to the attached drawings. It should be understood, however, that the detailed description of a specific example, while indicating the present embodiment of the invention, is given by way of illustration and not of limitation. Many changes and modifications may be made within the scope of the present invention without departing from the spirit thereof, and the invention includes all such modifications.

DESCRIPTION OF THE PREFERRED EMBODIMENT

Figure 1:
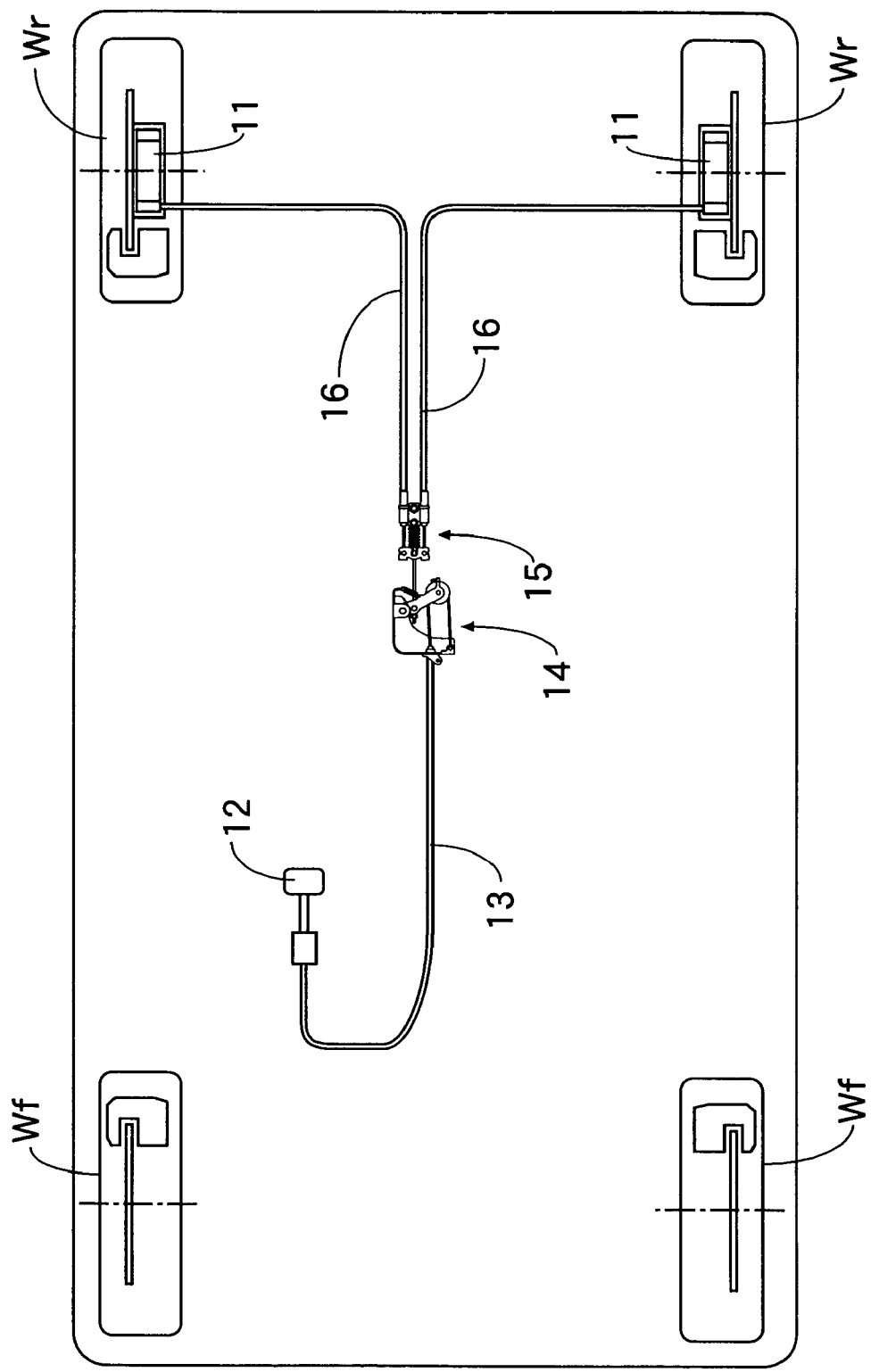
FIG. 1 is a plane schematic view of an entire body of a vehicle including a parking brake device according to an embodiment of the present invention.

As shown in FIG. 1, a vehicle having left and right front wheels Wf and Wf and left and right rear wheels Wr and Wr, includes brake devices 11 and 11 comprising drum brakes in the rear wheels Wr and Wr. A parking brake pedal 12 as a brake operation element for actuating the brake devices 11 and 11 is connected to a booster mechanism 14 via a first operation cable 13. The booster mechanism 14 is connected to the left and right brake devices 11 and 11 via an equalizer 15 and left and right second operation cables 16 and 16.

Figure 2:
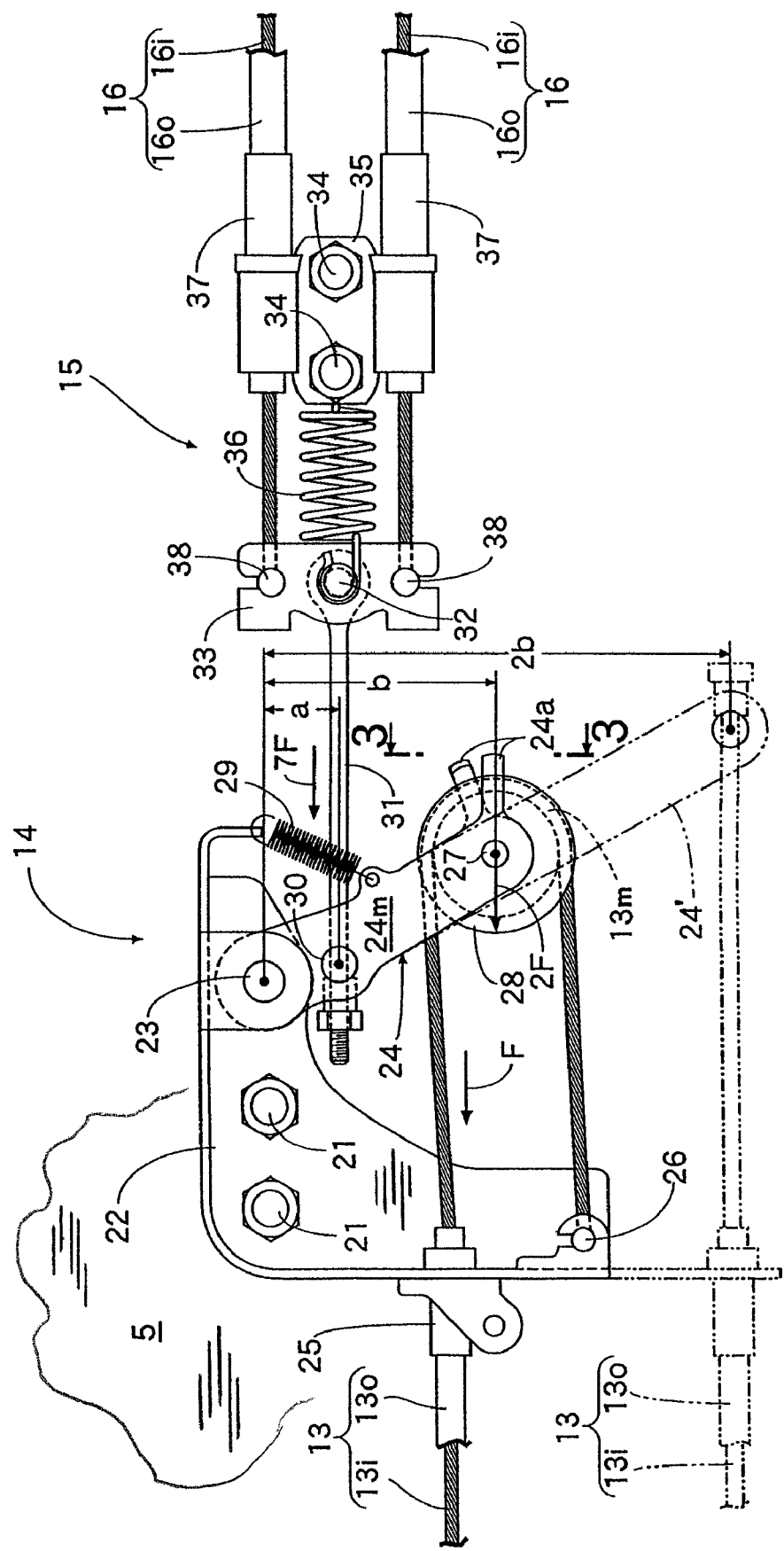
FIG. 2 is an enlarged view of a main part in FIG. 1, with an intermediate lever thereof shown in both solid lines and broken lines, respectively indicative of an actual length and a longer length which would be required without an improvement provided by the invention.
Figure 3:
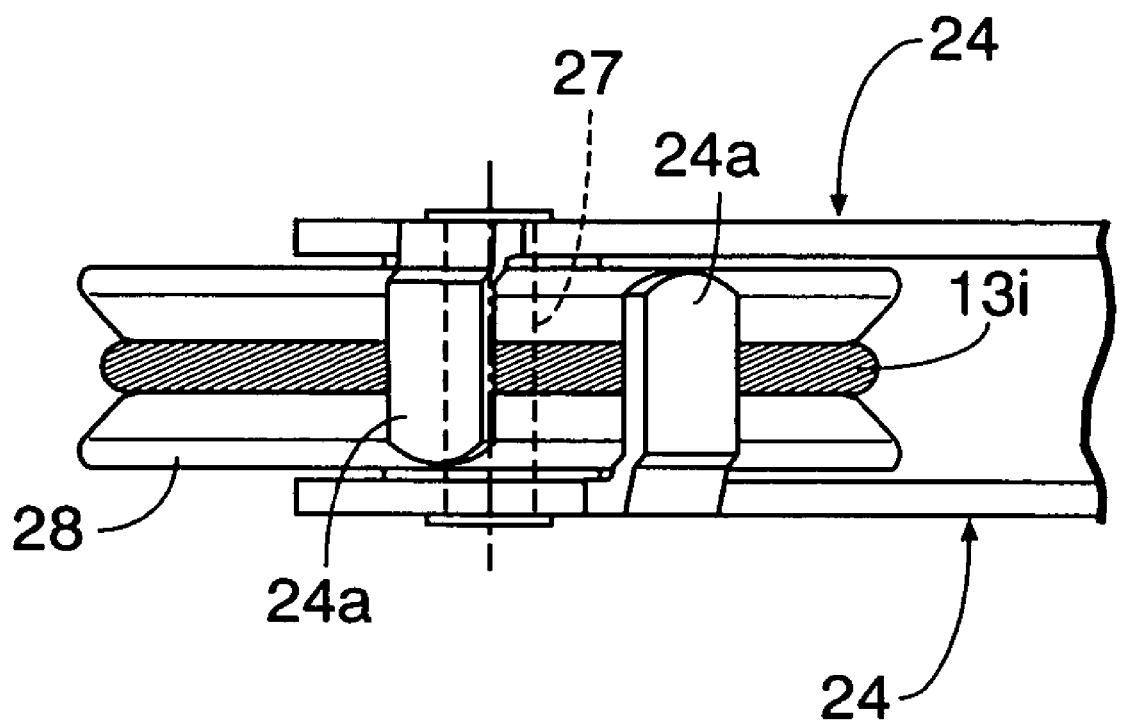
FIG. 3 is a view taken along the line 3-3 in FIG. 2.

As shown in FIGS. 2 and 3, a bracket 22 is fixed to a fixed part such as a floor panel with bolts 21 and 21, and one ends of intermediate levers 24 and 24 comprising a pair of upper and lower plate bodies are pivotally supported at this bracket 22 via a fulcrum pin 23. The first operation cable 13 connected to the parking brake pedal 12 comprises a Bowden cable including an inner cable 13$i$ and an outer tube 13$o$. An end portion of the outer tube 13$o$ is fixed to the bracket 22 via a fixing member 25, while an end portion of an inner cable 13$i$ exposed from the outer tube 13$o$ is fixed to the bracket 22 via a connecting pin 26.

A movable pulley 28 is rotatably supported at the other ends of the intermediate levers 24 and 24 via a rotating pulley shaft 27. The inner cable 13i exposed from the outer tube 13o is wound around this movable pulley 28. At this time, detachment preventing projections 24a and 24a projecting in a direction to approach each other from the upper and lower intermediate levers 24 and 24 are opposed to an outer peripheral surface of the movable pulley 28, whereby the inner cable 13i is prevented from being detached from the movable pulley 28. The intermediate levers 24 and 24 are biased in the counterclockwise direction around the fulcrum pin 23 by a coil spring 29 disposed between the intermediate levers 24, 24 and the bracket 22, and a tension is given to the inner cable 13i by the biasing force. It will be understood from FIG. 2 that the booster mechanism 14 according to the present invention includes: the intermediate lever 24 with one end pivotally supported at the vehicle body 5, the pulley 28 rotatably supported at the other end of the intermediate lever 24, the first operation cable 13 with an intermediate portion 13m wound around the pulley 28, one of opposite ends of the first operation cable 13 connected to the brake operation element and the other end thereof connected immovably to the vehicle body 5; and the second operation cable 16 with opposite ends respectively operatively connected to an intermediate portion 24m of the intermediate lever 24 and the brake device. The intermediate portion 24m of the intermediate lever 24 is disposed between the two ends, i.e., between the one end and the other end of the intermediate lever 24.

The equalizer 15 is constructed by a connecting rod 31 with one end pivotally supported via a connecting pin 30 on the intermediate levers 24 and 24 at a position near the fulcrum pin 23, a swing arm 33 with a central part pivotally supported at the other end of the connecting rod 31 via a connecting pin 32, a bracket 35 fixed to a fixed part such as a floor panel with bolts 34 and 34, and a coil spring 36 which biases the intermediate levers 24 and 24 in the counterclockwise direction by pulling the connecting rod 31 in the direction to be close to the bracket 35. Each of the second operation cables 16 is constructed by a Bowden cable including an inner cable 16i and an outer tube 16o. An end portion of the outer tube 16o is fixed to the bracket 35 via a fixing member 37, and an end portion of the inner cable 16i exposed from the outer tube 16o is fixed to the end portion of the swing arm 33 via a connecting pin 38.

The ratio b/a (lever ratio) of an arm length "a" between the fulcrum pin 23 of the intermediate levers 24, 24 and the connecting rod 31 and an arm length "b" between the fulcrum pin 23 of the intermediate levers 24, 24 and the rotating shaft 27 of the movable pulley 28 is set at 3.5 in the embodiment.

Next, an operation of the embodiment including the above-described construction will be explained.

When a driver steps on the parking brake pedal 12 to actuate the left and right brake devices 11 and 11, the inner cable 13i of the first operation cable 13 is pulled, and the intermediate levers 24 and 24 are drawn by the movable pulley 28 of the booster mechanism 14 via the inner cable 13i and rotated in the clockwise direction around the fulcrum pin 23, whereby the intermediate levers 24 and 24 pull the swing arm 33 of the equalizer 15 via the connecting rod 31. As a result, the inner cables 16i and 16i of a pair of the second operation cables 16 and 16 connected to the swing arm 33 are pulled, so that the brake devices 11 and 11 connected to them are actuated. Even if the lengths of the left and right second operation cables 16 and 16 are imbalanced at this time, the swing arm 33 swings with respect to the connecting rod 31, whereby the pulling force of the connecting rod 31 is transmitted equally to the left and right second operation cables 16 and 16, so that the left and right brake devices 11 and 11 generate equal braking force.

When the first operation cable 13 is pulled with a pulling force F, the pulling force F is boosted to a pulling force 2F which is double the pulling force F by an operation of the movable pulley 28. When the rotating shaft 27 with which the movable pulley 28 is supported on the intermediate levers 24 and 24 is pulled with the pulling force 2F, the pulling force 2F is transmitted to the connecting rod 31 while being boosted to 2F×3.5=7F due to the lever ratio of 3.5 of the intermediate levers 24, and therefore the brake devices 11 and 11 can be reliably actuated by pulling the second operation cables 16 and 16 with a sufficient pulling force.

When a boost ratio 7 same as that in the present embodiment is to be obtained with only the lever ratio of the intermediate levers 24 and 24 (or 24' and 24') without using the movable pulley 28, the lever ratio of the intermediate levers 24 and 24 needs to be increased to 7 from 3.5 in the embodiment as shown by the chain line in FIG. 2, leading to a problem that the length of the intermediate levers 24 and 24 is doubled and the required space for layout is significantly increased. On the other hand, the intermediate levers 24 and 24 and the movable pulley 28 are used in combination in this embodiment, and thereby, the length of the intermediate levers 24 and 24 is shortened and space required for layout can be reduced.

The embodiment of the present invention has been described above, but various design changes can be made without departing from the subject matter of the present invention.

For example, the parking brake pedal 12 is used as the brake operation element in this embodiment, but a parking brake lever or an electric actuator can be used instead of the parking brake pedal 12.

What is claimed is:

1. A parking brake device in which operation of a brake operation element is transmitted to a brake device via a first operation cable, a second operation cable, and a booster mechanism,
    wherein the booster mechanism comprises:
    a support bracket which is affixed to a vehicle body, wherein a portion of said first operation cable is attached to said support bracket;
    an intermediate lever having two opposing ends, with one end pivotally supported at a portion of the support bracket;
    a pulley rotatably supported a portion of the intermediate lever spaced away from said one end;
    the first operation cable with an intermediate portion wound around the pulley and one of opposite ends connected to the brake operation element and the other end connected immovably to the vehicle body; and
    further comprising at least one spring operatively connected to the intermediate lever, for biasing the intermediate lever in a brake-releasing direction;
    the second operation cable with opposite ends respectively operatively connected to an intermediate portion of the intermediate lever and the brake device, the intermediate portion of the intermediate lever disposed between the one end and the other end thereof.

2. A parking brake device according to claim 1 wherein said intermediate lever includes a projection opposed to an outer peripheral surface of the pulley to prevent the first operation cable from becoming detached from the pulley.

3. A parking brake device according to claim 1, wherein said second operation cable comprises a pair of second operation cables, each having one end operatively connected to the intermediate portion of the intermediate lever and an opposite end connected to a pair of the brake devices, respectively.

4. A parking brake device according to claim 3, further comprising an equalizer interposed between the one ends of the second operation cables and the intermediate portion of the intermediate lever.

5. A parking brake device according to claim 1, wherein the intermediate portion of the intermediate lever is near to the one end of the intermediate lever pivotally supported at the vehicle body relative to the other end of the intermediate lever, such that the intermediate portion is closer to the one end of the intermediate lever than to the other end of the intermediate lever.

6. A parking brake device according to claim 1, wherein
the one end of the intermediate lever is pivotally supported at the support bracket on a lever pivot pin,
the pulley is rotatably supported on the other end of the intermediate lever on a pulley shaft, and the booster mechanism provides a lever ratio of 3.5, where the lever ratio is defined as the ratio of the length between the lever pivot pin and a location of connection of the second operation cable to the intermediate lever, and the length between the lever pivot pin and the pulley shaft.

7. A parking brake device according to claim 6, further comprising a connecting rod having a first end which is operatively attached to a portion of the intermediate lever between a fulcrum pin and the pulley, and a second end which is operatively attached to the second operation cable.

8. A parking brake device according to claim 7, further comprising a swing arm having a central portion which is pivotally attached to the second end of the connecting rod, and wherein said second operation cable comprises a pair of second operation cables, each having one end connected to the swing arm, and an opposite end connected to one of a pair of the brake devices, respectively.

9. A parking brake device in which operation of a brake operation element is transmitted to a brake device via a first operation cable, a second operation cable, and a booster mechanism,
wherein the booster mechanism comprises:
an intermediate lever with one end pivotally supported at a vehicle body;
a pulley rotatably supported at the other end of the intermediate lever;
the first operation cable with an intermediate portion wound around the pulley and one of opposite ends connected to the brake operation element and the other end connected immovably to the vehicle body; and the second operation cable with opposite ends respectively operatively connected to an intermediate portion of the intermediate lever and the brake device,
the parking brake device comprising a pair of said intermediate levers each having one end pivotally supported at the vehicle body and the pulley rotatably supported at the other end thereof and each said intermediate lever also includes a projection to prevent the first operation cable from becoming detached from the pulley.

10. A parking brake device according to claim 9, further comprising at least one spring operatively connected to the intermediate lever, for biasing the intermediate lever in a brake-releasing direction.

11. A parking brake device for a vehicle, in which operation of a brake operation element is transmitted to a brake device via a first operation cable, a second operation cable, and a booster mechanism,
wherein the booster mechanism comprises:
an intermediate lever, the intermediate lever comprising a first end, a second end, and an intermediate portion disposed between the first and second ends, the first end of the intermediate lever being pivotally supported on a pin fixed to a vehicle body;
a pulley rotatably supported at the second end of the intermediate lever;
the first operation cable comprising an intermediate portion wound around the pulley and opposite ends respectively directly connected to the brake operation element and the vehicle body; and
the second operation cable comprising opposite ends respectively operatively connected to the intermediate portion of the intermediate lever and the brake device, wherein
said intermediate lever includes a projection opposed to an outer peripheral surface of the pulley to prevent the first operation cable from becoming detached from the pulley.

12. A parking brake device according to claim 11, wherein said second operation cable comprises a pair of second operation cables, each having one end operatively connected to the intermediate portion of the intermediate lever and an opposite end connected to a pair of the brake devices, respectively.

13. A parking brake device according to claim 12, further comprising an equalizer interposed between the one ends of the second operation cables and the intermediate portion of the intermediate lever.

14. A parking brake device according to claim 11, wherein the intermediate portion of the intermediate lever is near to the one end of the intermediate lever pivotally supported at the vehicle body relative to the other end of the intermediate lever, such that the intermediate portion is closer to the one end of the intermediate lever than to the other end of the intermediate lever.

15. A parking brake device according to claim 11, wherein
the second operation cable is operatively connected to an intermediate portion of the intermediate lever,
the one end of the intermediate lever is pivotally supported at the vehicle body on a lever pivot pin,
the pulley is rotatably supported on the other end of the intermediate lever on a pulley shaft, and the booster mechanism provides a lever ratio of 3.5, where the lever ratio is defined as the ratio of the length between the lever pivot pin and a location of connection of the second operation cable to the intermediate lever, and
the length between the lever pivot pin and the pulley shaft.

16. A parking brake device according to claim 11, further comprising at least one spring operatively connected to the intermediate lever, for biasing the intermediate lever in a brake-releasing direction.

* * * * *